US012097543B2

(12) United States Patent
Bourhis et al.

(10) Patent No.: US 12,097,543 B2
(45) Date of Patent: Sep. 24, 2024

(54) DEVICE FOR CLEANING AN OBJECT

(71) Applicant: AUUM, Paris (FR)

(72) Inventors: Mathieu Bourhis, Avon (FR); Thomas Munoz, Fontainebleau (FR); Clément Houllier, Paris (FR); Maxime Prieto, Paris (FR)

(73) Assignee: AUUM, Paris (FR)

( * ) Notice: Subject to any disclaimer, the term of this patent is extended or adjusted under 35 U.S.C. 154(b) by 427 days.

(21) Appl. No.: 17/604,225

(22) PCT Filed: Apr. 15, 2020

(86) PCT No.: PCT/EP2020/060624
§ 371 (c)(1),
(2) Date: Oct. 15, 2021

(87) PCT Pub. No.: WO2020/212446
PCT Pub. Date: Oct. 22, 2020

(65) Prior Publication Data
US 2022/0193736 A1 Jun. 23, 2022

(30) Foreign Application Priority Data
Apr. 19, 2019 (FR) ...................................... 1904235

(51) Int. Cl.
*B08B 9/08* (2006.01)
*B08B 9/093* (2006.01)

(52) U.S. Cl.
CPC .......... *B08B 9/0813* (2013.01); *B08B 9/0821* (2013.01); *B08B 9/0936* (2013.01)

(58) Field of Classification Search
CPC .... B08B 3/02; B08B 9/28; B08B 3/10; B08B 9/0813; B08B 2203/007; B08B 9/0821;
(Continued)

(56) References Cited

U.S. PATENT DOCUMENTS 1,337,303 A * 4/1920 Young ................. A47L 15/0065 134/138
1,584,913 A * 5/1926 Wilson ...................... B08B 9/28 134/102.1
(Continued)

FOREIGN PATENT DOCUMENTS

DK 196 07 447 A1 9/1997
EP 0593876 A1 4/1994
(Continued)

OTHER PUBLICATIONS

Machine translation of JP-2003053287-A (Year: 2003).*
(Continued)

*Primary Examiner* — David G Cormier
*Assistant Examiner* — Thomas Bucci
(74) *Attorney, Agent, or Firm* — Sughrue Mion, PLLC

(57) ABSTRACT

A cleaning device for cleaning an object having a peripheral edge defining a tubular portion of the object that is open at least one of its ends. The cleaning device has a cleaning enclosure, a first fluid feed duct for feeding fluid to the enclosure, and a first fluid discharge duct for discharging fluid from the enclosure. The cleaning enclosure has first and second enclosure portions. When the device is in its closed configuration at least one central zone of the second enclosure portion extends inside the first enclosure portion in order to define a reception space for receiving the object between the first enclosure portion and the central zone, which reception space extends all around the central portion.

18 Claims, 5 Drawing Sheets

(58) Field of Classification Search
CPC ......... B08B 3/04; B08B 11/02; B08B 9/0936; A61J 9/00; A61J 11/00; A61J 1/00; A61J 11/008; A47L 15/0065; A47L 15/505
USPC ........ 134/170, 103.2, 166 R, 198, 200, 99.1, 134/102.1, 30, 901, 152, 199, 25.2; 15/302, 310; 422/1, 300, 303
See application file for complete search history.

(56) References Cited

U.S. PATENT DOCUMENTS

| | | | | | |
|---|---|---|---|---|---|
| 2,501,193 | A * | 3/1950 | Schulte | A47J 36/24 | 126/369 |
| 3,092,120 | A * | 6/1963 | Hilger | A47L 15/0086 | 134/55 |
| 3,836,329 | A * | 9/1974 | Jordan | G01N 35/1095 | 134/22.12 |
| 3,849,830 | A * | 11/1974 | Wagner | B01L 13/02 | 134/171 |
| 4,263,054 | A * | 4/1981 | Giambalvo | A45C 11/005 | 134/21 |
| 4,310,010 | A * | 1/1982 | Svoboda | B08B 9/0321 | 134/201 |
| 4,560,455 | A * | 12/1985 | Porta | A01N 59/00 | 210/756 |
| 4,832,842 | A * | 5/1989 | Limb | G01N 1/4077 | 206/489 |
| 4,986,290 | A * | 1/1991 | Oguma | G02C 13/008 | 134/158 |
| 5,161,559 | A * | 11/1992 | Yoshihara | G02C 13/008 | 134/186 |
| 5,176,159 | A * | 1/1993 | Yoshihara | G02C 13/008 | 134/186 |
| 5,195,549 | A * | 3/1993 | Adams | B08B 3/10 | 134/901 |
| 5,522,410 | A * | 6/1996 | Meilleur | A47L 15/0065 | 134/108 |
| 5,616,184 | A * | 4/1997 | Duncan | B29D 11/00067 | 134/169 R |
| 5,695,721 | A * | 12/1997 | Kitagawa | B01F 27/92112 | 422/549 |
| 6,012,471 | A * | 1/2000 | Calvin | B29C 31/006 | 264/2.6 |
| 6,390,104 | B1 * | 5/2002 | Gagnon | A61C 17/036 | 134/107 |
| 6,581,614 | B1 * | 6/2003 | Gotfried | B08B 9/28 | 134/171 |
| 6,932,094 | B2 * | 8/2005 | Chen | B08B 9/093 | 134/170 |
| 7,216,655 | B2 * | 5/2007 | Halbmaier | B08B 3/02 | 134/171 |
| 8,919,360 | B1 | 12/2014 | Ransley | | |
| 9,451,863 | B1 * | 9/2016 | Larson | A47L 15/0034 | |
| 2003/0188769 | A1 * | 10/2003 | Eisenberg | B08B 9/32 | 134/152 |
| 2004/0123885 | A1 * | 7/2004 | Myong | B08B 9/28 | 134/179 |
| 2005/0051192 | A1 * | 3/2005 | Fujita | B08B 9/0321 | 134/22.12 |
| 2006/0243309 | A1 * | 11/2006 | Prescott | B01D 41/04 | 134/198 |
| 2011/0155068 | A1 * | 6/2011 | Maier | B08B 3/04 | 134/166 R |
| 2011/0192431 | A1 * | 8/2011 | Semans | B08B 3/04 | 134/166 R |
| 2012/0216838 | A1 * | 8/2012 | Semans | B08B 3/10 | 134/25.1 |
| 2014/0150830 | A1 * | 6/2014 | Semans | B08B 3/04 | 134/108 |
| 2014/0283877 | A1 * | 9/2014 | Sonoda | A47L 15/0065 | 134/170 |
| 2015/0075565 | A1 * | 3/2015 | Foucault | B08B 3/04 | 134/21 |
| 2015/0107630 | A1 * | 4/2015 | Varnals | A47L 15/0065 | 15/302 |
| 2017/0065145 | A1 * | 3/2017 | Dallal | A47L 15/0089 | |
| 2018/0092505 | A1 * | 4/2018 | Simon | B05B 9/0403 | |
| 2018/0126424 | A1 * | 5/2018 | Semans | B08B 3/10 | |
| 2020/0215583 | A1 * | 7/2020 | Leventhal | B08B 3/02 | |
| 2022/0410225 | A1 * | 12/2022 | Hitchens | B08B 9/0826 | |

FOREIGN PATENT DOCUMENTS

| | | | | |
|---|---|---|---|---|
| EP | 1 954 414 | A2 | 8/2008 | |
| GB | 2260483 | A * | 4/1993 | A47L 15/0065 |
| JP | 2003053287 | A * | 2/2003 | |
| KR | 10-0686198 | B1 | 2/2007 | |
| KR | 20-2013-0005454 | U | 9/2013 | |
| WO | WO-2007063540 | A2 * | 6/2007 | A61L 2/07 |
| WO | 2015/084904 | A1 | 6/2015 | |
| WO | 2018/087519 | A1 | 5/2018 | |

OTHER PUBLICATIONS

International Search Report for PCT/EP2020/060624 dated Jun. 24, 2020.
Written Opinion for PCT/EP2020/060624 dated Jun. 24, 2020.

* cited by examiner

DEVICE FOR CLEANING AN OBJECT

CROSS REFERENCE TO RELATED APPLICATIONS

This application is a National Stage of International Application No. PCT/EP2020/060624 filed Apr. 15, 2020, claiming priority based on French Patent Application No. 1904235 filed Apr. 19, 2019.

The present invention relates to the field of devices for cleaning objects.

BACKGROUND OF THE INVENTION

Usually, an object cleaning device comprises:

a cleaning enclosure arranged to have a plurality of objects placed therein;

at least one first fluid feed duct opening out into the cleaning enclosure for feeding it with fluid; and at least one first fluid discharge duct opening out into the cleaning enclosure in order to remove the fluid contained in the enclosure.

The cleaning enclosure comprises at least first and second enclosure portions, and the cleaning device being adapted to adopt selectively:

an enclosure-open configuration in which the first and second enclosure portions are spaced apart from each other to allow objects to be inserted in and/or to be extracted from the enclosure; and an enclosure closed configuration in which the first enclosure portion bears against the second enclosure portion in order to close the enclosure in leaktight manner.

Objects that include one or more hollow zones are particularly difficult to clean since the hollow zones are difficult for the cleaning fluid to access.

Thus, an object that presents a peripheral edge defining a tubular portion of the object that is open at one of the ends of the object is particularly difficult to clean.

OBJECT OF THE INVENTION

An object of the present invention is to provide a cleaning device that enables the quality with which such an object is cleaned to be improved.

SUMMARY OF THE INVENTION

To this end, the invention provides a cleaning device for cleaning an object having a peripheral edge defining a tubular portion of the object that is open at an end of the object, the cleaning device comprising:

a cleaning enclosure arranged to have said object placed therein;

at least one first fluid feed duct opening out into the cleaning enclosure for feeding it with fluid; and at least one first fluid discharge duct opening out into the cleaning enclosure in order to remove the fluid contained in the enclosure;

said cleaning enclosure comprises at least first and second enclosure portions, and the cleaning device being adapted to adopt selectively:

an enclosure-open configuration in which the first and second enclosure portions are spaced apart from each other to allow said at least one object to be extracted from the enclosure; and an enclosure closed configuration in which the first enclosure portion bears against the second enclosure portion in order to close the enclosure in leaktight manner.

The cleaning device of the invention is essentially characterized in that it includes at least one central zone of said the second enclosure portion that, when the cleaning device is in its closed configuration, extends inside the first enclosure portion in order to define a reception space for receiving said object between the first enclosure portion and the central zone of the second enclosure portion, which reception space extends all around the central portion, said feed ducts being arranged to open out into said reception space for receiving the object.

In order to understand the invention, the term “a tubular portion of an object” designates a hollow portion of the object defined by the object having a peripheral edge that forms a closed loop, the tubular portion being open to the outside of the object at at least one terminal end of the object.

This reception space for receiving said object is such that said central zone of the second enclosure portion can extend inside the tubular portion of said object when this tubular portion extends all around the central zone, between the central zone and said first enclosure portion.

As measured in a cross-section plane of the object, a tubular portion of the object may have a maximum width that is greater than the length of the tubular portion, or vice versa.

By means of the device of the invention, the object-reception space is made more compact around the object since the second enclosure portion has a central zone that is shaped to be capable of extending inside the tubular portion of the object.

Thus, when the device is in is closed configuration and the object is placed inside the enclosure, the tubular portion extends around the central zone, between the central zone and the first enclosure portion.

The fluid (which may be vapor and/or liquid and/or gas) is thus guided by the central zone towards the inside of the tubular portion of the object.

It is thus possible to improve the effectiveness with which the object is cleaned.

This characteristic also makes it possible to minimize the quantity of fluid that needs to be injected into the enclosure in order to clean the object.

Furthermore, since the space between the enclosure and the inside surface of the object is minimized, it is possible to provide better management of the speed of the stream of fluid along the wall of the object.

In another aspect, the invention also provides an assembly comprising:

an object having a peripheral edge defining a tubular portion of the object that is open at at least one of its ends, this tubular portion presenting an inside surface; and a cleaning device in accordance with any of the embodiments of the cleaning device of the invention, the cleaning device being placed in its enclosure closed configuration, said object being arranged inside said reception space with more than 90% of said inside surface being placed at a distance from said central zone of the second enclosure portion that lies in the range 0.1% to 10% of a maximum outside dimension of said object.

There is thus a central zone of the cleaning device that is adapted to the object for cleaning.

This adaptation of the cleaning device enhances the quality of the cleaning and the efficiency of the device of the invention.

BRIEF DESCRIPTION OF THE DRAWINGS

Other characteristics and advantages of the invention appear clearly from the following description given by way of nonlimiting indication and with reference to the accompanying drawings, in which.

DETAILED DESCRIPTION OF THE INVENTION

Figure 1:
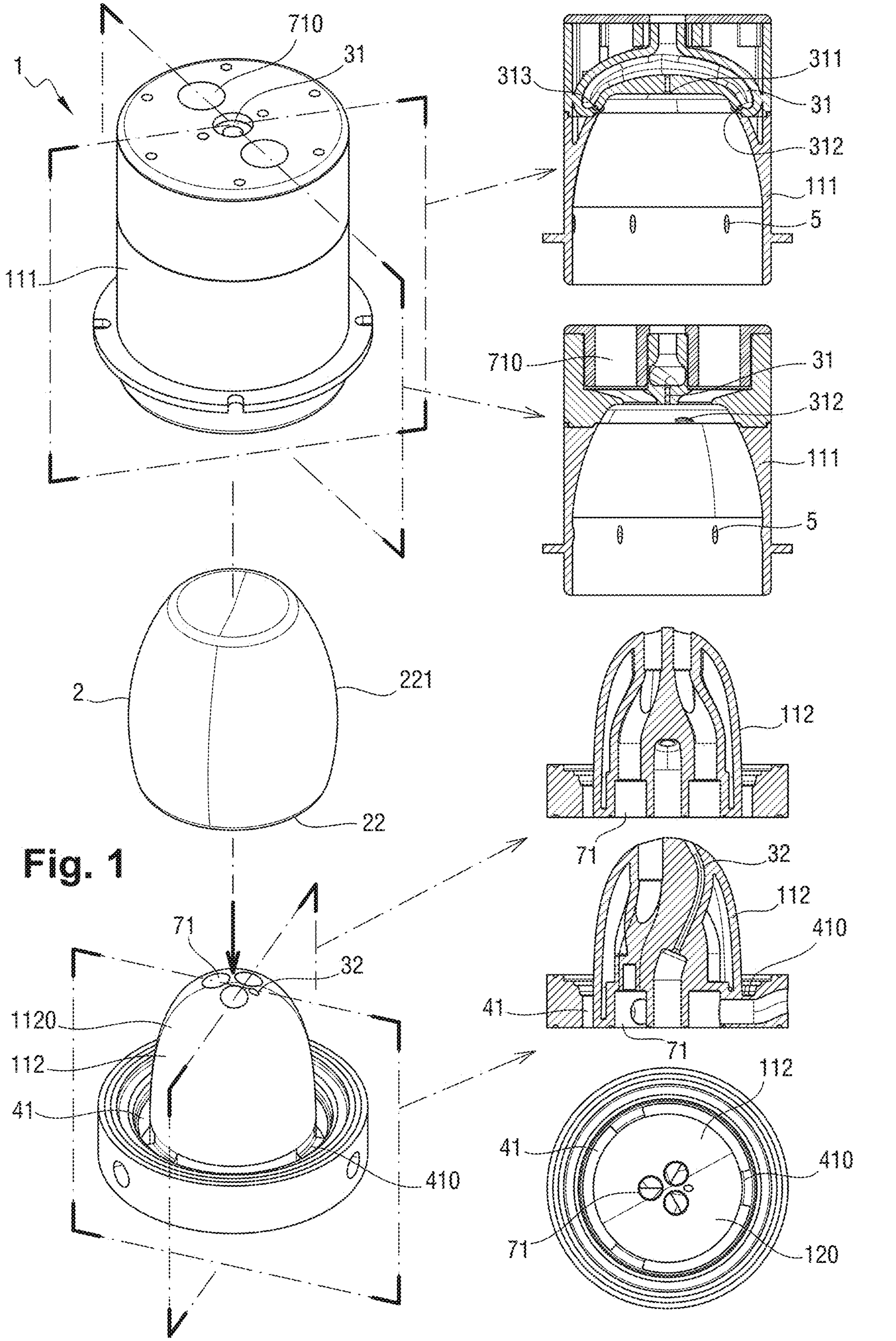
FIG. 1 is an exploded perspective view of a portion of the cleaning device of the invention together with an object for cleaning, which in this example is a glass, FIG. 1 including a plurality of longitudinal sections of first and second portions of the enclosure.

The cleaning device 1 of the invention is adapted specifically to cleaning an object 2 that has a peripheral edge 20 defining a tubular portion 21 of the object 2, this tubular portion 21 being open towards the outside of the object at least one of its ends 22.

The object may be open at both of its ends (which object may be a tube or a drinking straw), or it may be open at only one of its ends (which object may be a vessel having a bottom).

In the embodiments shown in FIGS. 1, 2, 4, and 5, the object 2 is a vessel 2 comprising a wall that is formed by a bottom 23 of the vessel and a peripheral edge 20 in the form of a closed loop that extends from the bottom 23 and all around the bottom 23.

In the various embodiments shown in FIGS. 1 to 5, the cleaning device 1 comprises:

- a cleaning enclosure 11 arranged to have said object 2 placed therein;
- at least one first fluid feed duct 31 opening out into the cleaning enclosure 11 in order to feed it with fluid (specifically, the fluid is a cleaning fluid that may be constituted by liquid and/or by vapor and that may include cleaning particles);
- at least one first fluid discharge duct 41 opening out into the cleaning enclosure 11 in order to remove the fluid contained in the enclosure 11; and
- said cleaning enclosure 11 comprises at least first and second enclosure portions 111 and 112.

The cleaning device 1 is adapted to adopt selectively:

- an enclosure-open configuration in which the first and second enclosure portions 111 and 112 are spaced apart from each other to allow said object to be extracted from the enclosure 11; and
- an enclosure-closed configuration in which the first enclosure portion 111 bears against the second enclosure portion 112 in order to close the enclosure 11 in leaktight manner.

The cleaning device of the invention is essentially characterized in that it includes at least one central zone 1120 of said second enclosure portion 112 that, when the cleaning device 1 is in its closed configuration, extends inside the first enclosure portion 111 (along an inside face of the first enclosure portion 111) in order to define a reception space 110 for receiving said object 2 between the first enclosure portion 111 and the central zone 1120 of the second enclosure portion 112, which reception space extends all around the central zone 1120.

This reception space 110 for receiving said object 2 is such that said central zone 1120 of the second enclosure portion 112 can extend inside the tubular portion 21 of said object 2 while the tubular portion 21 extends all around the central zone 1120, between the central zone 1120 and said first enclosure portion 111. The ducts 31 and 41 are arranged to open out towards said reception space 110 for receiving the object 2.

In other words, when the device is in its closed configuration, the central zone 1120 of the second enclosure portion 112 extends inside said first enclosure portion 111 while being spaced apart from said first enclosure portion 111 in order to create a reception space 110 for receiving said object 2.

The reception space 110 extends all around the central zone 1120 of the second enclosure portion 112.

Thus, the object 2 can be placed between the first enclosure portion 111 and the central zone 1120, the central zone 1120 then extending inside the tubular portion 21 of the object 2 while establishing a fluid flow passage all around the object between the object and the enclosure.

As explained above, the device 1 of the invention makes it possible to have a cleaning enclosure 11 that is particularly compact since it is shaped to receive a single object 2 with a central zone 1120 of the second enclosure portion 112 that penetrates into the object 2.

This reduces the volume between the enclosure and the object, thereby serving to reduce the quantity of cleaning fluid needed for cleaning.

The cost and the time required for cleaning the object can thus be minimized.

Preferably, when the device 1 is in its closed configuration, the central zone 1120 of the second enclosure portion 112 penetrates into the inside of the first enclosure portion over at least 30%, preferably at least 50%, more preferably at least 80% of the depth of the first enclosure portion 111.

This central zone 1120 is in the form of a volume of revolution around an axis of symmetry of the central zone. Specifically, in this example the central zone 1120 is in the shape of a dome.

Figure 2:
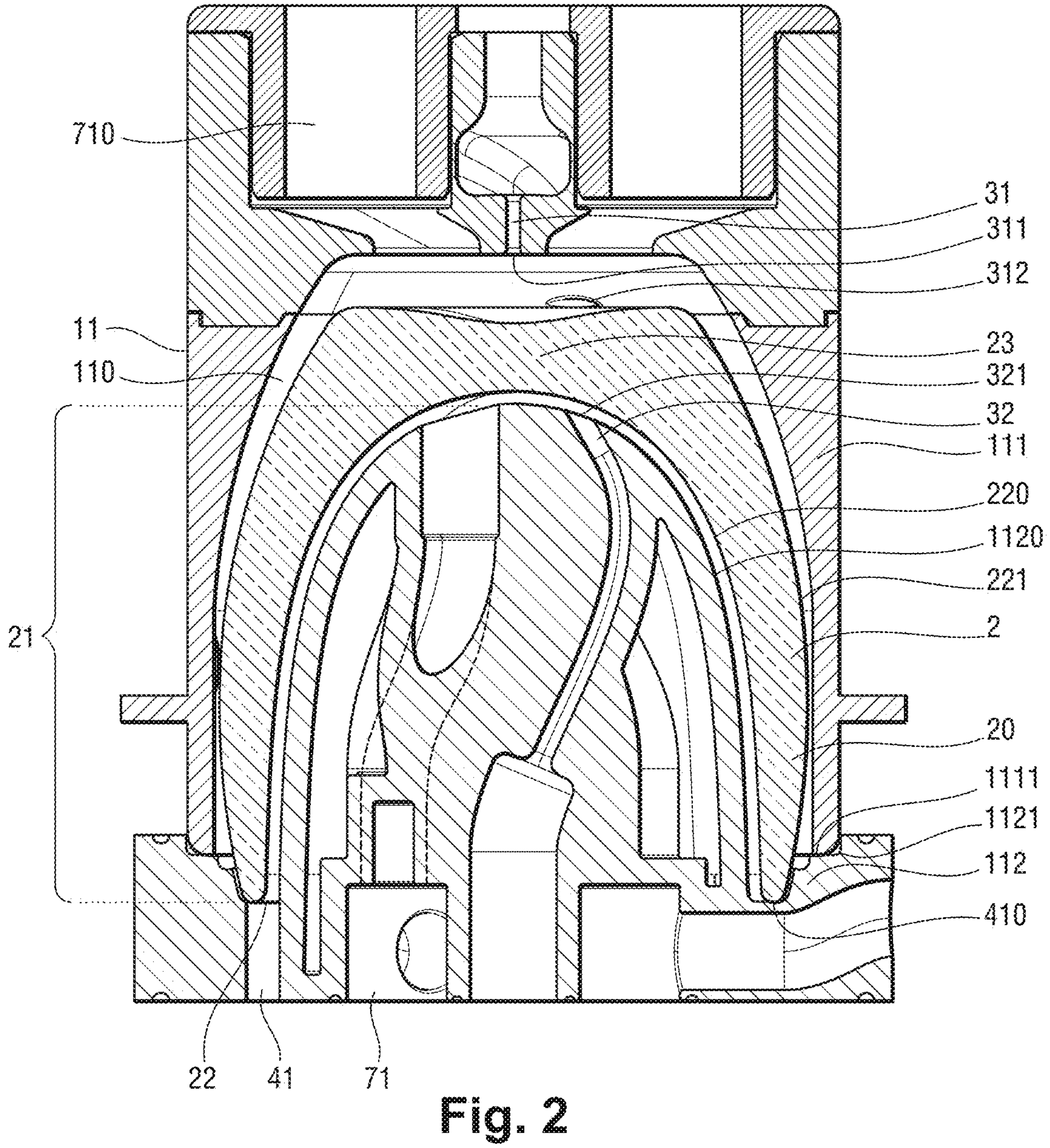
FIG. 2 is a section view of the enclosure of the cleaning device of the invention and of an object for cleaning that is placed inside the enclosure, FIG. 2 showing the cleaning device in its configuration with the enclosure closed.

As can be seen in FIGS. 1 and 2, the first enclosure portion 111 presents a peripheral edge 1111, and said second enclosure portion presents a peripheral edge 1121.

These peripheral edges 1111 and 1121 of the first and second enclosure portions 111 and 112 are arranged to bear against each other to provide peripheral sealing between the first and second enclosure portions 111 and 112 when the cleaning device 1 is in its closed configuration.

The central zone 1120 of the second enclosure portion 112 is spaced apart from the peripheral edge 1121 of said second enclosure portion.

Preferably, said first fluid feed duct 31 is formed in a wall of said first enclosure portion 111.

This first fluid feed duct 31 being in communication with said reception space 110 for receiving the object via at least one feed perforation 311, 312, 313 formed through the wall of said first enclosure portion 111.

The device 1 also has a second fluid feed duct 32 opening out into the cleaning enclosure 11 in order to feed it with fluid.

This second fluid feed duct 32 is formed in a wall of said second enclosure portion 112 and is in communication with said reception space 110 for receiving the object 2 via at least one feed perforation 321 formed through the wall of said second enclosure portion 112.

Figure 4:
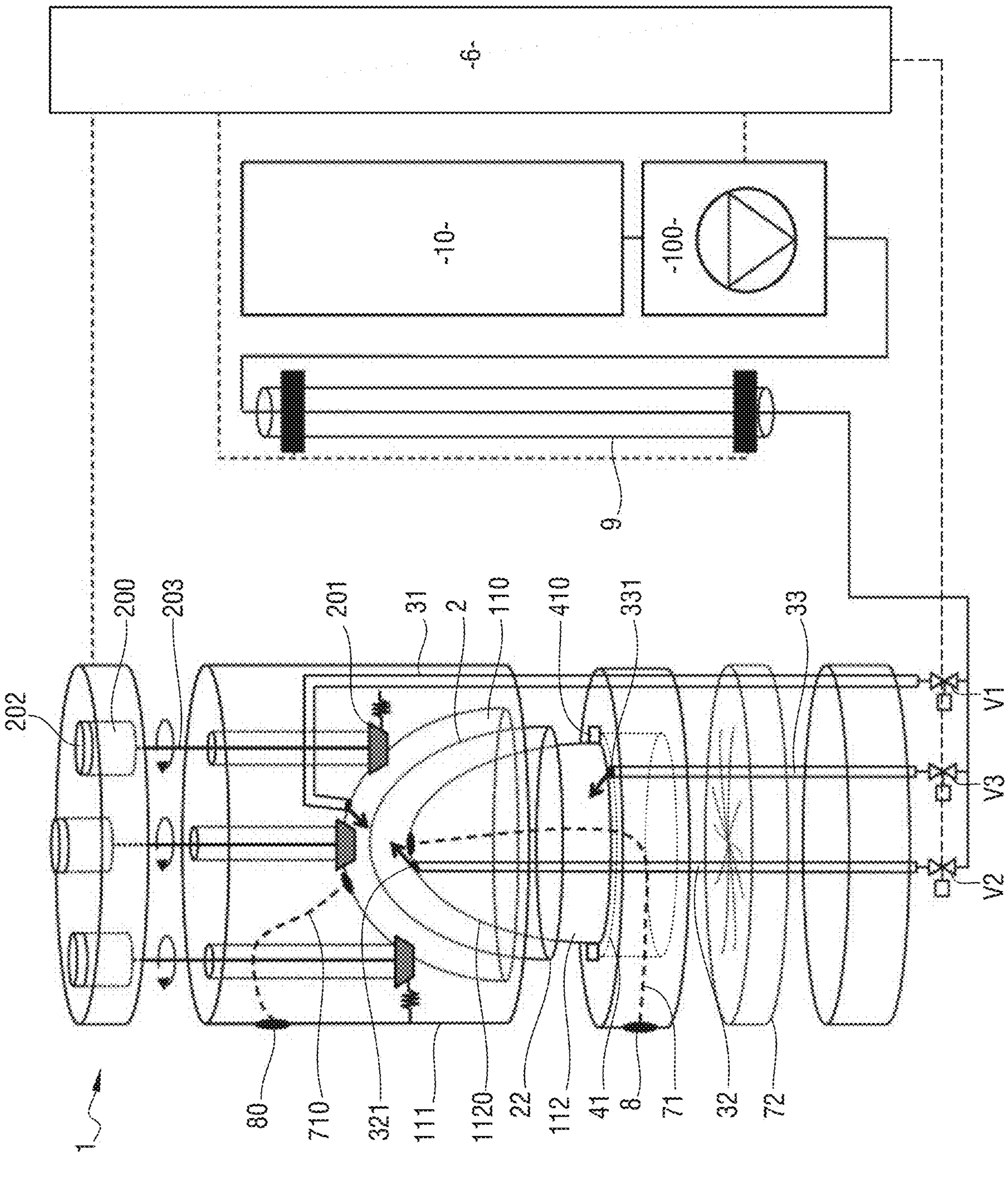
FIG. 4 is a diagrammatic view of a particular embodiment of the cleaning device of the invention having both means for driving rotation of the object for cleaning while it is in position in the enclosure, and also at least two fluid feed ducts opening out into the enclosure respectively towards an inside surface of the object and towards an outside surface of the object.
Figure 5:
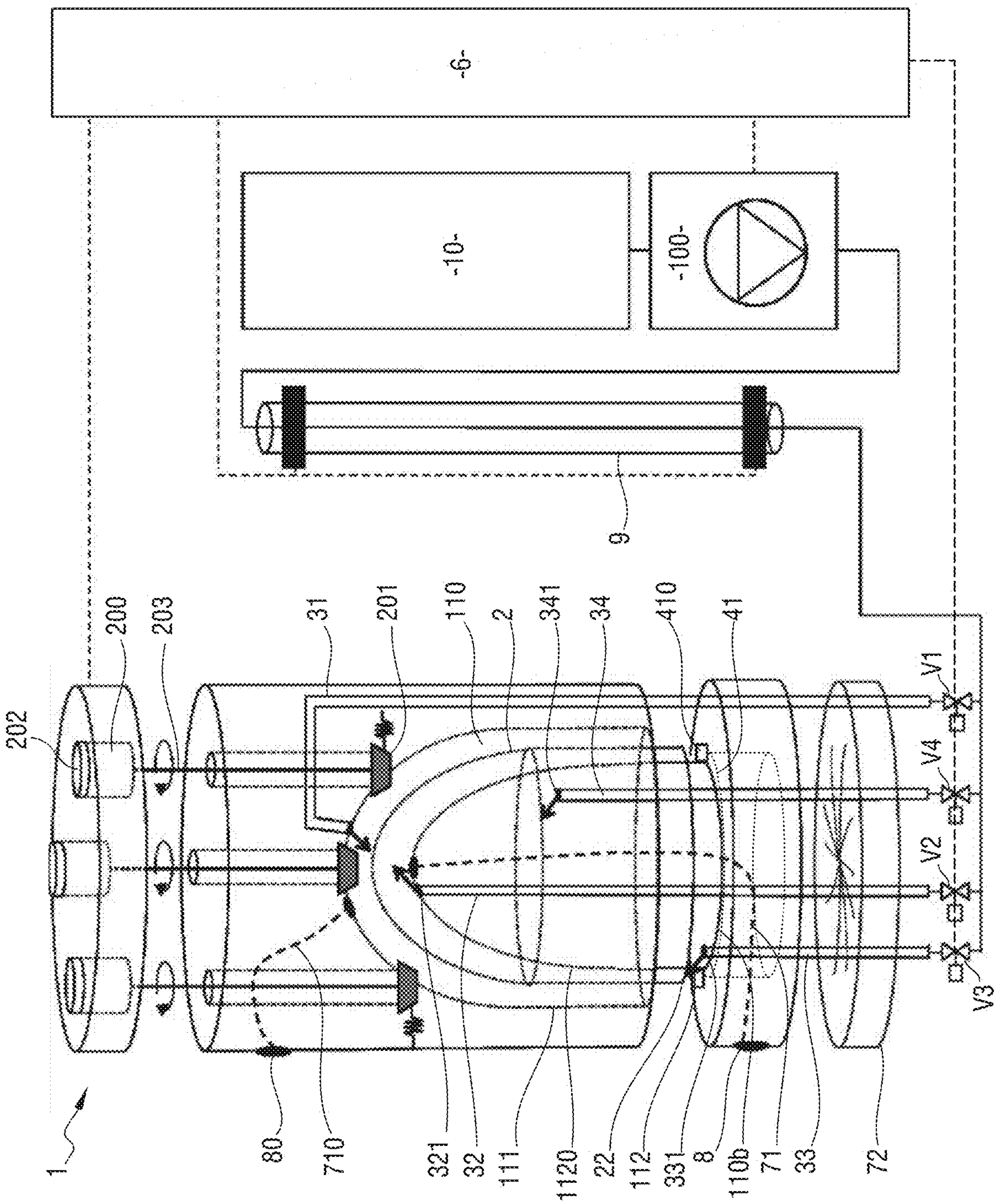
FIG. 5 is a diagrammatic view of an embodiment of the cleaning device of the invention, the device in this example being adapted to cleaning an object of larger size than in FIG. 4, and for this purpose the device includes a third fluid feed duct that opens out into the enclosure at a distance from the other two feed ducts, this third duct opening out towards the inside surface of the object at its peripheral edge.

Preferably, and as shown in FIGS. 4 and 5, the device 1 also has a third fluid the duct 33 that opens out into the cleaning enclosure 11 in a reception zone 110*b* for receiving an end of the tubular portion of the peripheral edge 20 of the object.

This third duct 33 serves to inject cleaning fluid against a terminal end of the tubular portion of the object 2, thereby improving the cleaning of that zone.

When the object 2 for cleaning is a glass, the fluid injected via the third duct 33 is directed towards the lip of the glass (where the lip is one of the zones of a glass that is the most contaminated and the most difficult to clean).

This third duct 33 opens out into the space 110 via a perforation 331.

Fluid is fed into the enclosure:

- via at least one feed perforation, specifically via three perforations 311, 312, and 313 formed through the wall of said first portion 111 of the enclosure 11 that is above the second enclosure portion 112;
- via at least one feed perforation 321 formed through the wall of said second enclosure portion 112 that is under the first enclosure portion 111; and optionally
- via other perforations connected to other fluid feed ducts such as the third duct 33.

The first feed duct 31 is arranged to open out facing an outside surface 221 of the object and the second feed duct 32 is arranged to open out facing an inside surface 220 of the object.

The first enclosure portion 111 presents a main recess defining the reception space 110, this recess being defined by a surface of revolution that extends around a main axis of symmetry of this first enclosure portion 111.

The first feed duct 31 extends in the wall of the first enclosure portion 111 and the first perforation 311 opens out into the reception space 110 at the bottom of the main recess.

This first duct 31 is in the shape of an arc extending along the main recess, and the second and third perforations 312 and 313 that connect this first duct 31 to the reception space 110 are formed on opposite sides of the main recess of the first enclosure portion 111, specifically at the terminal ends of the arcuate shape of the first duct 31.

Preferably, at least some of the perforations 311, 312, 313, and 321 point along a fluid outlet axis that forms a fluid feed angle relative to a line tangential to the enclosure at the location of the perforation, which fluid feed angle is less than 45°, and preferably equal to 25° plus or minus 15°, relative to the surface of the reception space through which the feed perforation is made.

The effect of the feed angle is to cause the fluid to arrive tangentially relative to the object for cleaning.

This encourages the fluid stream to flow uniformly over the entire surface for cleaning.

Figure 3:
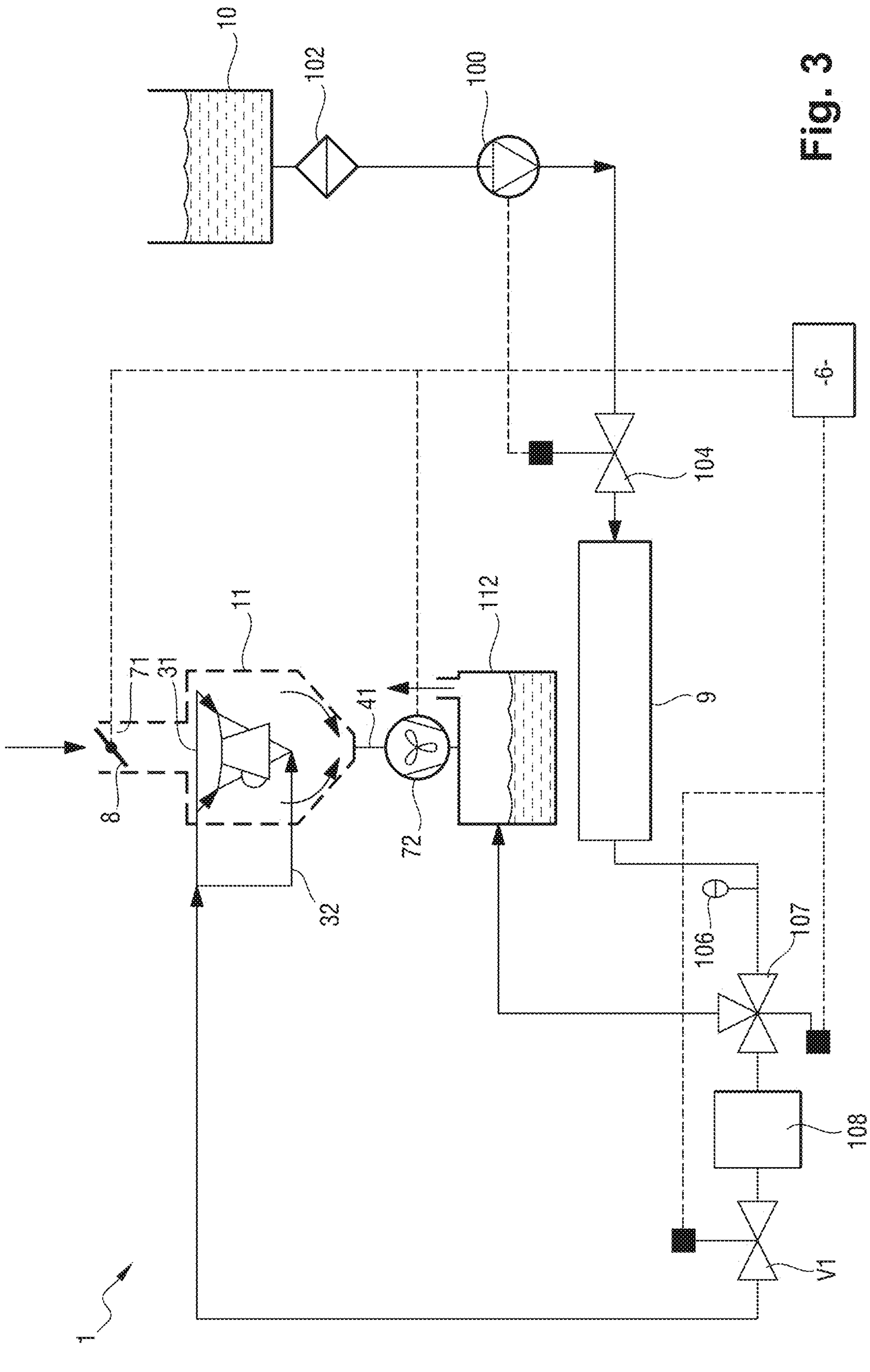
FIG. 3 is a diagrammatic view of the cleaning device of the invention.

As shown in FIGS. 3, 4, and 5, the device 1 may also include a control unit 6 for controlling the device 1.

The control 6 is connected to a first solenoid valve V1 for causing the first solenoid valve V1 to change state between a first state in which the first solenoid valve allows fluid to pass to the enclosure via the first feed duct 31 and a second state in which the first solenoid valve V1 prevents fluid from passing to the enclosure 11 via the first feed duct 31.

In the embodiment of FIG. 3, this first solenoid valve V1 is connected both to the first duct 31 and to the second duct 32 in such a manner that:

- when the first solenoid valve V1 is in its first state, it allows fluid to pass to the enclosure via the first and second ducts 31 and 32; and
- when the first solenoid valve V1 is in its second state, it prevents fluid from passing to the enclosure via the first and second feed ducts 31 and 32.

In contrast, in the embodiment of the FIGS. 4 and 5, the device has a second solenoid valve V2 connected to said control unit 6 to cause the state of the second solenoid valve V2 to change between:

- a first state in which the second solenoid valve V2 allows fluid to pass to the enclosure 11 via the second feed duct 32; and
- a second state in which the second solenoid valve V2 prevents fluid from passing to the enclosure 11 via the second feed duct V2.

As can be understood from the embodiments shown in FIGS. 4 and 5, the first solenoid valve V1 serves selectively to close said at least one first feed duct 31, and the second solenoid valve V2 serves selectively to close said at least one second feed duct 32.

Since the first and second feed ducts 31 and 32 open out into the enclosure 11 at locations that are spaced apart, it is thus possible to select the location where the fluid is injected into the enclosure as a function of the shape of the object for cleaning and/or as a function of a cleaning cycle involving feeding via the first and second ducts 31 and 32 in succession.

According to the invention, and as a function of the shape of the size of the enclosure 11 that is adapted to receive the object for cleaning, it is possible to have more than two feed ducts, optionally fitted with respective solenoid valves controlled by the control unit.

Thus, in accordance with embodiments of FIGS. 4 and 5, the control unit is also connected to a third solenoid valve V3 for causing the third solenoid valve V3 to change state between a first state in which the third solenoid valve allows fluid to pass to the enclosure via the third feed duct 33 and a second state in which the third solenoid valve V3 prevents fluid from passing to the enclosure via the third feed duct 33.

In the embodiment shown in FIG. 5, there is a fourth fluid feed duct 34 that opens out into the reception space 110 via at least one perforation 341 formed in the wall of the second enclosure portion 112.

This perforation 341 is spaced apart from the other perforations 311, 321, and 331 that connect the other ducts to the enclosure 11.

This fourth duct 34 enables additional fluid to be admitted into the enclosure, which is particularly useful when the size of the enclosure is large. In this example, the enclosure 11 of FIG. 5 is adapted to receive a vessel such as a carafe or a water bottle that is larger in size than the drinking glass of FIG. 4.

As shown in FIGS. 1 to 5, the device may also include a first air admission duct 71 leading to the enclosure 11 that opens out into the cleaning enclosure 11 in order to admit air therein.

This first air admission duct 71 is fitted with closure means 8 for closing the first air admission duct (e.g. a checkvalve 8 or a solenoid valve controlled by the control unit 6) and adapted to allow air to pass into the enclosure while preventing fluid from leaving the enclosure via the air admission duct 71. The closure means 8 are preferably located as close as possible to the enclosure, specifically less than 1 centimeter (cm) from the enclosure, preferably less than 2 millimeters (mm) from the enclosure.

Air admission 71 is useful for drying the object that has been cleaned and for removing residual cleaning fluid and for cooling the object. Cooling is produced by heat being removed by the air flowing along the object and by the effect of evaporation. The latent heat of vaporization causes the vessel to lose heat.

Ideally, air is admitted at a temperature that lies preferably in the range 10° C. to 70° C., more preferably in the range 10° C. to 50° C., ideally at the ambient temperature around the device plus or minus 5° C.

By means of this embodiment, as soon as the pressure inside the enclosure 11 increases, e.g. because fluid such as liquid or vapor is being injected therein via the first and/or second and/or third read duct 31, 32, or 33, the checkvalve 8 closes the air admission duct 71.

In contrast, the checkvalve 8 allows air to pass via the first air admission duct 71 as soon as the pressure inside the air admission duct 71 exceeds the pressure inside the enclosure 11 by at least a predetermined pressure difference value.

Alternatively, as an alternative to this solution with a checkvalve 8, it is possible for the duct 71 to be fitted with an air admission solenoid valve 8 connected to said control unit 6 for causing the air admission solenoid valve to change state between:

- a first state in which the air admission solenoid valve allows air to pass via the first air admission duct 71; and
- a second state in which the air admission solenoid valve 8 prevents air from passing via the air admission duct 71.

In this embodiment as shown in FIGS. 3, 4, and 5, while fluid is being injected via at least one of the feed ducts 31, 32, or 33, the air admission solenoid valve 8 is actuated to occupy its second state to prevent fluid from passing via the air admission duct.

In contrast, after the cleaning fluid has been injected, the object is to be dried and the air admission solenoid valve 8 is activated so as to allow air to pass via the air admission duct 71.

The device 1 also includes a heater body 9 adapted to heat a liquid.

In a particular embodiment, the heater body 9 is adapted to generate vapor from the liquid.

The heater body 9 is in fluid flow connection with all of the fluid feed ducts 31, 32, and 33 in order to be able to feed the cleaning enclosure 11 with fluid that has been heated by the heater body 9.

The device also includes a storage tank 10 for storing said liquid and that is in fluid flow connection with said heater body 9 in order to be fed with liquid.

The device 1 also has a pump 100 for forcing said liquid to be admitted into the heater body 9.

Ideally, the pump 100 and the heater body 9 are also connected to said control unit 6, which can serve to control both heating by the heater body 9 and also liquid being pumped by the pump 100 in compliance with a predetermined cycle.

In a particular embodiment, the storage tank 10 and the pump 100 could be replaced by a connection to a potable liquid supply network external to the device 1.

In the embodiments of FIGS. 1 to 5, it can be seen that the first air admission duct 71 passes through the second enclosure portion 112 and opens out into the enclosure 11 through the second enclosure portion 112. This is advantageous for facilitating drying of the inside surface 220 of the object 2.

Preferably, as shown by the same embodiments of FIGS. 1 to 5, the device includes a second air admission duct 710 that passes through the first enclosure portion 111 and opens out into the enclosure 11 through the first enclosure portion 111.

This is advantageous for facilitating drying of the outside surface 220 of the object 2.

In the same manner as for said first air admission duct 71, the second air admission duct 710 may be fitted with a checkvalve 80 adapted to allow air to pass to the enclosure 11 and to prevent fluid from leaving the enclosure 11 via the second duct 710.

Alternatively, and in the same manner as for said first air admission duct 71, the second air admission duct 710 may be fitted with a solenoid valve 80 that is connected to the control unit 6 selectively to allow air to pass to the reception space 110 for receiving the object.

Preferably, The device includes an air blower 72 in fluid flow connection with the first air admission duct 71 and/or with the second air admission duct 710 and/or with the first fluid discharge duct 41 in order to be able to force air to flow through the enclosure all around the object 2.

This embodiment serves to accelerate drying and cooling the object 2.

By connecting the blower 72 to the discharge duct 41, it is possible with a single blower to force air to flow from the admission ducts 71 and 710 to the enclosure in such a manner as to have streams of air passing along the inside and outside surfaces 220 and 221 of the object and then going to the discharge duct 41. This makes drying particularly effective.

Ideally, the blower 72 is preferably connected to the control unit 6 in order to establish a flow of air through said enclosure 11 selectively and in compliance with a cleaning cycle.

Preferably, the first fluid discharge duct 41 is formed in a wall of said second enclosure portion 112, with the first fluid discharge duct 41 being in communication with said reception space 110 for receiving the object via at least one discharge perforation formed through the wall of said second enclosure portion 112.

Thus, fluid is discharged from the enclosure 11 via a discharge perforation formed through the wall of said second enclosure portion 112 (the second enclosure portion 112 is preferably under the first enclosure portion 111, making it easier for fluid to flow under gravity out from the enclosure 11).

This discharge perforation 41 formed through the wall of said second enclosure portion 112 is preferably annular and formed facing a portion of said reception space 110 that is adapted to receive the peripheral edge 20 of the object.

Thus, air and fluids tend to be discharged facing the peripheral edge 20 of the object.

Arrangements may be made for abutments 410 for supporting the object 2 to extend through the discharge perforation that is to receive the tubular portion 21 of the object.

These abutments 410 serve to support and/or hold the object when it is inserted in the object-reception space 110.

Preferably, and as shown in FIGS. 1, 2, 4, and 5, the second enclosure portion 112 is formed by a lower part of presenting a central portion and a ring-shaped portion around the periphery of the central portion. The support abutments 410 form spokes connecting the central portion to the ring-shaped portion.

The first admission duct 71 that passes through the second enclosure portion 112 can pass successively through the ring-shaped portion, through one of the spokes, and through the central portion from which it opens out into the object-reception space.

As can be seen in the embodiments shown in FIGS. 4 and 5, the device of the invention may also include rotation means 200 for setting the object 2 into rotation.

These rotation means 200 are arranged to exert a tangential force on said object 20 that is located in said object-reception space 110, which tangential force tends to drive the object in rotation relative to said cleaning enclosure 11.

Rotation 200 serves to make cleaning and drying uniform.

The rotation means 200 may be implemented in various ways.

In the embodiment of FIGS. 4 and 5, these means 200 comprise a plurality of drive wheels 201 placed inside the enclosure 11 and at least one drive motor 202 for driving at least one of the drive wheels 201.

The connection between a drive wheel 201 and a motor 202 preferably takes place via a rotary drive shaft 203 passing through the wall of one of the portions of the enclosure 11.

Each given shaft 203 passes through a corresponding perforation through the wall of the enclosure 11 and it is mounted to rotate relative to the perforation about an axis of symmetry of the given shaft 203, with a sealing gasket extending against the shaft to oppose the passage of fluid along the given shaft.

As an alternative to the wheel or in addition to the wheels, the rotation means 200 may comprise nozzles for injecting fluid into the enclosure, the nozzles being oriented tangentially relative to an inside surface of the enclosure.

Thus, the fluid injected tangentially to the inside surface of the enclosure exerts a tangential force on the vessel, thereby setting it in rotation.

During cleaning of the vessel the fluid may be liquid and/or vapor, and during drying of the vessel it may be air.

Thus, at least some of the fluid feed ducts 31, 32 and/or at least some of the admission ducts 71, 710 may be fitted with such fluid injection nozzles that are oriented tangentially relative to an inside surface of the enclosure.

It is also possible for the device 1 to have cleaning nozzles inside the enclosure that are for use only when the enclosure does not contain the object 2.

These cleaning nozzles can be used for cleaning the enclosure after the object has been removed from the enclosure.

Such cleaning nozzles open out at various locations in the enclosure, and some of them may face portions of the enclosure that are masked while the object is located inside the enclosure.

In a particular embodiment of the device of the invention, at least one of the first and second enclosure portions 111 and 112 may be deformable between a compacted shape in which the volume of the reception space 110 for receiving the object 2 is at a maximum and an expanded shape in which the volume of the reception space 110 for receiving the object 2 is at a minimum.

In this embodiment, it is possible to change the shape of the first enclosure portion 111 and/or of the second enclosure portion 112.

The deformable enclosure portion is thus moved up to the object while it is in its "expanded" shape, and it is moved away from the object while it is in its "compacted" shape.

There is thus a capability for adjusting shape, which can be useful for adapting the enclosure to the shape of the object.

Thus, it may thus be desired to increase the object-reception space in order to make it easier to remove the object from the enclosure, and on the contrary it may be desired to reduce that space in order to minimize the volume of fluid that needs to flow between the enclosure and the object for cleaning.

This variation in shape may also be advantageous for adapting the shape of the enclosure to the shape of the object for cleaning.

This is particularly advantageous in order to be able to clean objects of different sizes and/or different shapes using the same cleaning device 1.

In order to be deformable, the deformable enclosure portion may comprise a diaphragm of that is elastically deformable:

- under the effect of a fluid under pressure injected against a zone of the diaphragm for causing it to move towards the object (the zone of the diaphragm that is subjected to the fluid pressure may be a fluid passage inside the diaphragm or it may be a face of the diaphragm that is subjected to the pressure of the fluid); and/or
- under the effect of a diaphragm thrust mechanism adapted to move the diaphragm towards the object.

Said at least one enclosure portion, whether deformable or not, may also include projections 5 projecting into the reception space 110 for receiving the object 2.

These projections 5 are for bearing against the object when it is placed in the enclosure while said at least one enclosure portion is in its expanded shape while defining a fluid passage around the projections, between the object and said at least one deformable enclosure portion.

As can be seen in the example shown in FIG. 3, the device 1 includes a storage tank 10 for storing the cleaning liquid that is in fluid flow connection with the inlet of the heater body 9 via a duct that passes in succession through:

- a descaling filter 102;
- a pump 100 for forcing said liquid to be admitted into said heater body 9; and
- a two-port valve 104 controlled by the control unit 6.

The two-port valve is movable between an open configuration in which it closes the duct connecting the pump 100 to the pump body 9 and a closed configuration in which it allows liquid to pass via said duct.

A temperature probe 106 is arranged to measure the temperature of the fluid leaving the heater body, which probe is connected to the control unit 6.

Thus, by taking account of a temperature measurement taken by the probe 106, the control unit 6 can regulate the heating of the fluid by the heater body so as to reach a target temperature for the cleaning fluid.

At its outlet, the heater body 9 is connected to a first port of a three-port solenoid valve 107 controlled by the control unit 6.

An effluent tank 112 is also connected to a second port of this solenoid valve 107 and to the first fluid discharge duct 41.

Thus, the effluent tank 112 serves to collect the effluent coming from the enclosure 11 and the effluent coming from the heater body 9.

By way of example, the first and second ports of the solenoid valve 107 are put into communication when it is desired to clean the heater body 9.

This solenoid valve 107 also has a third port that is connected to an input of a tank 108 that serves to store a volume of heated fluid for injecting into the enclosure.

The output from the tank 108 is connected, via said first two-port solenoid valve V1, to the first and second fluid feed ducts 31 and 32 that open out into the enclosure 11 via said first two-port solenoid valve V1.

The volume of this tank 108 is chosen to accumulate and store fluid heated by the heater body 9, e.g. liquid and/or vapor, and then to deliver it to the enclosure 111.

This tank 108 serves to provide a buffer of heated fluid located between the heater body and the enclosure 11. This may be advantageous in order to benefit from instantaneous heating power that is greater than the power that can be generated instantaneously by the heater body.

This also makes it possible to heat the fluid by means of the heater body 9 while keeping it isolated from the enclosure 11.

It is also possible for the device 1 not to include the tank 108. Under such circumstances, the third port of the three-port solenoid valve 107 is not connected to the inlet of the tank 108, but is connected directly to at least one of the ducts 31 and 32, the first valve V1 then being constituted by this solenoid valve 107.

Finally, as mentioned above, the invention also provides an assembly comprising:

- an object 2 having a peripheral edge 20 defining a tubular portion 21 that is open at at least one of its ends 22, this tubular portion presenting an inside surface 220; and
- a cleaning device 1 in accordance with any of the embodiments described above, whether taken singly or in combination, the device being placed in its enclosure closed configuration.

The object is placed inside said reception space so that more than 90% of its inside surface 220 is placed at a distance from said central zone 1120 of the second enclosure portion 112 that lies in the range 0.1% to 10% of a maximum outside dimension of said object 2.

With more than 90% of the inside surface 220 of the tubular portion being placed at a distance from the central zone 1120 of the enclosure that lies in the range 0.1% to 10% of a maximum dimension of said object, the volume for fluid flow that is generated along the inside wall 220 of the object 2 is limited. This serves to limit fluid consumption during cleaning and to obtain a small fluid flow section between the enclosure and the model of the object.

This serves to increase the speed of the fluid along the wall of the object for cleaning.

By limiting the volume of fluid that needs to flow through the enclosure, the consumption of fluid needed for cleaning the object is reduced, as is the energy needed for cleaning the object.

Specifically, the smaller the volume of this fluid, the smaller the amount of energy needed for heating the fluid and for causing it to flow. This increases the energy efficiency of the device of the invention.

In similar manner, the first enclosure portion is such, that when the object is placed in the enclosure and the device is in its closed configuration, then more than 90% of the outside surface 221 of the object 2 is placed at a distance from the first enclosure portion 111 that lies in the range 0.1% to 10% of the maximum outside dimension of said object 2.

Thus, for an object having a maximum outside dimension of 10 cm (which dimension may be the length of the object or its span), more than 90% of the entire surface of the wall of the object facing the enclosure of the cleaning device in the enclosure-closed configuration is placed at a distance therefrom lying in the range 0.1 mm to 1 cm, preferably equal to 0.5 mm.

By means of the invention, it is ensured that the reception space 110 for receiving the object presents a shape that is close to the shape of the object. This serves to optimize the flow of cleaning fluid so as to improve cleaning.

The invention claimed is:

1. An assembly comprising:

- an object having a peripheral edge defining a tubular portion of the object that is open at at least one of its ends, this tubular portion presenting an inside surface; and
- a cleaning device for cleaning said object, said cleaning device comprising:
  - a cleaning enclosure arranged to have said object placed therein;
  - a first fluid feed duct opening out into the cleaning enclosure for feeding it with fluid; and
  - a first fluid discharge duct opening out into the cleaning enclosure in order to remove the fluid contained in the enclosure;
- said cleaning enclosure comprises at least first and second enclosure portions, and the cleaning device being adapted to adopt selectively:
  - an enclosure-open configuration in which the first and second enclosure portions are spaced apart from each other to allow said object to be extracted from the enclosure; and
  - an enclosure closed configuration in which the first enclosure portion bears against the second enclosure portion in order to close the enclosure in a leaktight manner;
- the device including a central zone of said second enclosure portion that, when the cleaning device is in its closed configuration, extends inside the first enclosure portion in order to define a reception space for receiving said object between the first enclosure portion and the central zone of the second enclosure portion, which reception space extends all around the central zone, said first fluid feed duct being arranged to open out into said reception space for receiving the object, the assembly being characterized in that said object is arranged inside said reception space of the cleaning device placed in its enclosure closed configuration with more than 90% of said inside surface being placed at a distance from said central zone of the second enclosure portion that lies in the range 0.1% to 10% of a maximum outside dimension of said object; and
- wherein the cleaning device further comprises a second fluid feed duct opening out into the cleaning enclosure in order to feed the cleaning enclosure with fluid;
- said first fluid feed duct being formed in a wall of said first enclosure portion, said first fluid feed duct being in communication with said reception space for receiving the object via at least one feed perforation formed through said wall of said first enclosure portion; and
- said second fluid feed duct being formed in a wall of said second enclosure portion, said second fluid feed duct being in communication with said reception space for receiving the object via at least one feed perforation formed through said wall of said second enclosure portion.

2. The assembly according to claim 1, wherein said first enclosure portion presents a peripheral edge and said second enclosure portion presents a peripheral edge, the peripheral edges of the first and second enclosure portions being arranged to come to bear against each other and to define peripheral sealing between the first and second enclosure portions when the cleaning device is in its closed configuration.

3. The assembly according to claim 1, wherein at least one of the first and second enclosure portions is deformable between a first shape in which the volume of the reception space for receiving the object is at a maximum and a second shape in which the volume of the reception space for receiving the object is at a minimum.

4. The assembly according to claim 3, wherein said at least one deformable enclosure portion includes projections projecting into the reception space for receiving the object.

5. The assembly according to claim 1, wherein the cleaning device further comprises a third fluid feed duct opening out into the cleaning enclosure in a reception zone for receiving an end of the tubular portion of the peripheral edge of the object.

6. The assembly according to claim 1, wherein the cleaning device includes a control unit for controlling the device;

said control unit being connected to a first solenoid valve (V1) for causing the first solenoid valve (V1) to change state between a first state in which the first solenoid valve allows fluid to pass to the enclosure via the first fluid feed duct and a second state in which the first solenoid valve (V1) prevents fluid from passing to the enclosure via the first fluid feed duct; and said control unit also being connected to a second solenoid valve (V2) for causing the second solenoid valve (V2) to change state between a first state in which the second solenoid valve (V2) allows fluid to pass to the enclosure via the second fluid feed duct and a second state in which the second solenoid valve (V2) prevents fluid from passing to the enclosure via the second fluid feed duct (V2).

7. The assembly according to claim 6, wherein the cleaning device includes a first air admission duct for admitting air to the enclosure, the first air admission duct opening out into the cleaning enclosure and being fitted with closure means for closing the first admission duct and adapted to allow air to pass to the enclosure and to prevent fluid from leaving the enclosure via the air admission duct.

8. The assembly according to claim 1, wherein the cleaning device (1) includes a heater body adapted to heat a liquid, the heater body being in fluid flow connection with said first fluid feed duct so as to be capable of feeding the cleaning enclosure with fluid heated by the heater body.

9. The assembly according to claim 8, wherein the cleaning device includes a storage tank for storing said liquid, the storage tank being in fluid flow connection with said heater body to feed it with liquid, the device (1) also including a pump for forcing said liquid to be admitted into said heater body.

10. The assembly according to claim 6, wherein a second air admission duct passes through the first enclosure portion and opens out into the enclosure through the first enclosure portion.

11. The assembly according to claim 1, wherein said first fluid discharge duct is formed in a wall of said second enclosure portion, said first fluid discharge duct being in communication with said reception space for receiving the object via at least one discharge perforation formed through said wall of said second enclosure portion.

12. The assembly according to claim 11, wherein said at least one discharge perforation formed through said wall of said second enclosure portion is formed facing a portion of said reception space that is adapted to receive the peripheral edge of the object.

13. The assembly according to claim 12, wherein the cleaning device includes support abutments for supporting said object, said support abutments extend across said at least one discharge perforation for receiving the tubular portion of the object.

14. The assembly according to claim 1, wherein the cleaning device includes rotation means for rotating the object, the rotation means being arranged to be capable of exerting a tangential force on said object located in said reception space, which tangential force tends to drive the object in rotation relative to said cleaning enclosure.

15. The assembly according to claim 14, wherein the object rotation means comprise a plurality of drive wheels placed inside the enclosure and at least one drive motor for driving at least one of the drive wheels.

16. The assembly according to claim 14, wherein the rotation means for rotating the object comprise fluid injection nozzles inside the enclosure and oriented tangentially relative to an inside surface of the enclosure.

17. The assembly according to claim 14, wherein the cleaning device also includes nozzles for cleaning the inside of the enclosure.

18. The assembly according to claim 7, wherein the first air admission duct passes through the second enclosure portion and opens out into the enclosure through the second enclosure portion.

* * * * *